US010452306B1

(12) United States Patent
Natanzon et al.

(10) Patent No.: US 10,452,306 B1
(45) Date of Patent: Oct. 22, 2019

(54) METHOD AND APPARATUS FOR ASYMMETRIC RAID

(71) Applicant: EMC IP Holding Company LLC, Hopkinton, MA (US)

(72) Inventors: Assaf Natanzon, Tel Aviv (IL); Arieh Don, Newton, MA (US); Zvi Gabriel Benhanokh, Tel Aviv (IL); Alexandr Veprinsky, Brookline, MA (US); Eitan Bachmat, Lehavim (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 186 days.

(21) Appl. No.: 14/144,651

(22) Filed: Dec. 31, 2013

(51) Int. Cl.
*G06F 3/06* (2006.01)
*G06F 12/00* (2006.01)

(52) U.S. Cl.
CPC .......... *G06F 3/065* (2013.01); *G06F 3/0613* (2013.01); *G06F 3/0689* (2013.01)

(58) Field of Classification Search
CPC .......... G06F 11/3485; G06F 17/30082; G06F 17/30156; G06F 17/302; G06F 17/30215; G06F 2003/0697; G06F 3/0631; G06F 3/067; G06F 17/5072; G06F 3/0659; G06F 12/0811; G06F 3/061; G06F 3/0679; G06F 3/0688; G06F 3/0689; G06F 12/0246; G06F 3/0613; G06F 13/1657; G06F 3/065; G06F 12/0842; G06F 12/0866; G06F 2212/7208; G06F 3/0619; G06F 3/068; G06F 3/0685

USPC .......... 711/162, E12.001, E12.103, E12.008, 711/117, 154
See application file for complete search history.

(56) References Cited

U.S. PATENT DOCUMENTS

| 5,206,939 | A | 4/1993 | Yanai et al. |
| 5,778,394 | A | 7/1998 | Galtzur et al. |
| 5,845,147 | A | 12/1998 | Vishlitzky et al. |
| 5,857,208 | A | 1/1999 | Ofek |
| 6,792,519 | B2 * | 9/2004 | Constable ............. G06F 3/0614 711/114 |
| 8,463,825 | B1 * | 6/2013 | Harty ................ G06F 17/30233 707/813 |
| 8,631,423 | B1 * | 1/2014 | Indalkar ............. G06F 9/45558 719/328 |
| 8,745,102 | B2 * | 6/2014 | Hussain ............. G06F 16/1827 707/822 |
| 8,806,070 | B2 * | 8/2014 | Bita ...................... G06F 3/0604 710/6 |
| 8,843,711 | B1 * | 9/2014 | Yadav ................... G06F 3/0608 711/154 |
| 8,930,647 | B1 * | 1/2015 | Smith ................. G06F 9/44557 711/154 |

(Continued)

*Primary Examiner* — Yaima Rigol
*Assistant Examiner* — Edward Waddy, Jr.
(74) *Attorney, Agent, or Firm* — Workman Nydegger

(57) ABSTRACT

Example embodiments of the present invention relate to a method, an apparatus, and a computer program product for mirroring data in a data storage system across a first storage device having a first latency and a second storage device having a second latency. The method includes receiving an I/O at the data storage system and controlling the I/O to the first storage device having the first latency or the second storage device having the second latency according to properties of the I/O and properties of the first storage device having the first latency and the second storage device having the second latency.

17 Claims, 15 Drawing Sheets

(56) References Cited

U.S. PATENT DOCUMENTS

| | | | | |
|---|---|---|---|---|
| 9,043,530 B1* | 5/2015 | Sundaram | ............... | G06F 3/068 |
| | | | | 711/100 |
| 9,323,659 B2* | 4/2016 | Shats | ................. | G06F 12/0246 |
| 2002/0019908 A1* | 2/2002 | Reuter | ................. | G06F 3/0605 |
| | | | | 711/112 |
| 2009/0031097 A1* | 1/2009 | Nelson | ................ | G06F 11/1435 |
| | | | | 711/162 |
| 2010/0153793 A1* | 6/2010 | Murray | ............... | G06F 12/0246 |
| | | | | 714/718 |
| 2010/0332401 A1* | 12/2010 | Prahlad | ............... | G06F 17/3002 |
| | | | | 705/80 |
| 2011/0252178 A1* | 10/2011 | Wang | ................... | G06F 3/0607 |
| | | | | 710/316 |
| 2011/0320690 A1* | 12/2011 | Petersen | ............... | G06F 3/0611 |
| | | | | 711/103 |
| 2012/0233417 A1* | 9/2012 | Kalach | ............... | G06F 11/1453 |
| | | | | 711/162 |
| 2012/0254497 A1* | 10/2012 | Ni | ......................... | G06F 15/167 |
| | | | | 711/6 |
| 2014/0215123 A1* | 7/2014 | Baryudin | ............ | G06F 13/4239 |
| | | | | 711/103 |
| 2014/0258612 A1* | 9/2014 | Kalwitz | ................ | G06F 3/0619 |
| | | | | 711/114 |
| 2014/0310473 A1* | 10/2014 | Bilas | ....................... | G06F 11/00 |
| | | | | 711/129 |

* cited by examiner

METHOD AND APPARATUS FOR ASYMMETRIC RAID

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage.

BACKGROUND

Host processor systems may store and retrieve data using a storage device containing a plurality of host interface units (i.e. host adapters), disk drives, and other physical storage, and disk interface units (i.e., disk adapters). Such storage devices are provided, for example, by EMC Corporation of Hopkinton, Mass., and are disclosed in, for example, U.S. Pat. No. 5,206,939 to Yanai et a., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the physical storage of the storage device directly, but rather access what appears to the host systems as a plurality of logical volumes. The logical volumes may or may not correspond to the actual disk drives and/or other physical storage.

SUMMARY

Example embodiments of the present invention relate to a method, an apparatus, and a computer program product for mirroring data in a data storage system across a first storage device having a first latency and a second storage device having a second latency. The method includes receiving an I/O at the data storage system and controlling the I/O to the first storage device having the first latency or the second storage device having the second latency according to properties of the I/O and properties of the first storage device having the first latency and the second storage device having the second latency.

BRIEF DESCRIPTION OF THE DRAWINGS

The above and further advantages of the present invention may be better under stood by referring to the following description taken into conjunction with the accompanying drawings in which:

FIGS. 2D-1-2D-3 are a block diagram illustrating a cleanup operation for a first storage device having a lower latency and a second storage device having a higher latency at respective times;

FIG. 3 is a block diagram illustrating a system for storing cached I/Os to the second storage device;

DETAILED DESCRIPTION

Flash drives are significantly more expensive then SATA drives. Using RAID 5 or RAID 6 on Flash drives uses a lot of space as protection space and thus makes RAID protection on Flash very expensive. Further, traditional RAID 5 and RAID 6 algorithms require multiple reads and multiple writes for each I/O thereby reducing the performance benefit of Flash. Additionally, traditional RAID arrays require mirroring between storage devices of the same type, thereby making Flash-based traditional RAID arrays quite expensive. Typically, SATA devices have poor random access performance and Flash drives have excellent random access performance; the sequential speed of Flash drives is similar to that of SATA drives. Further, Flash drives are more expensive than SATA drives and have limited write cycles. Accordingly, example embodiments of the present invention overcome these and other deficiencies by enabling RAID for mixed storage devices (e.g., SSD, SATA, Flash) while maintaining Flash performance but at a price closer to that of SATA.

Figure 1A:
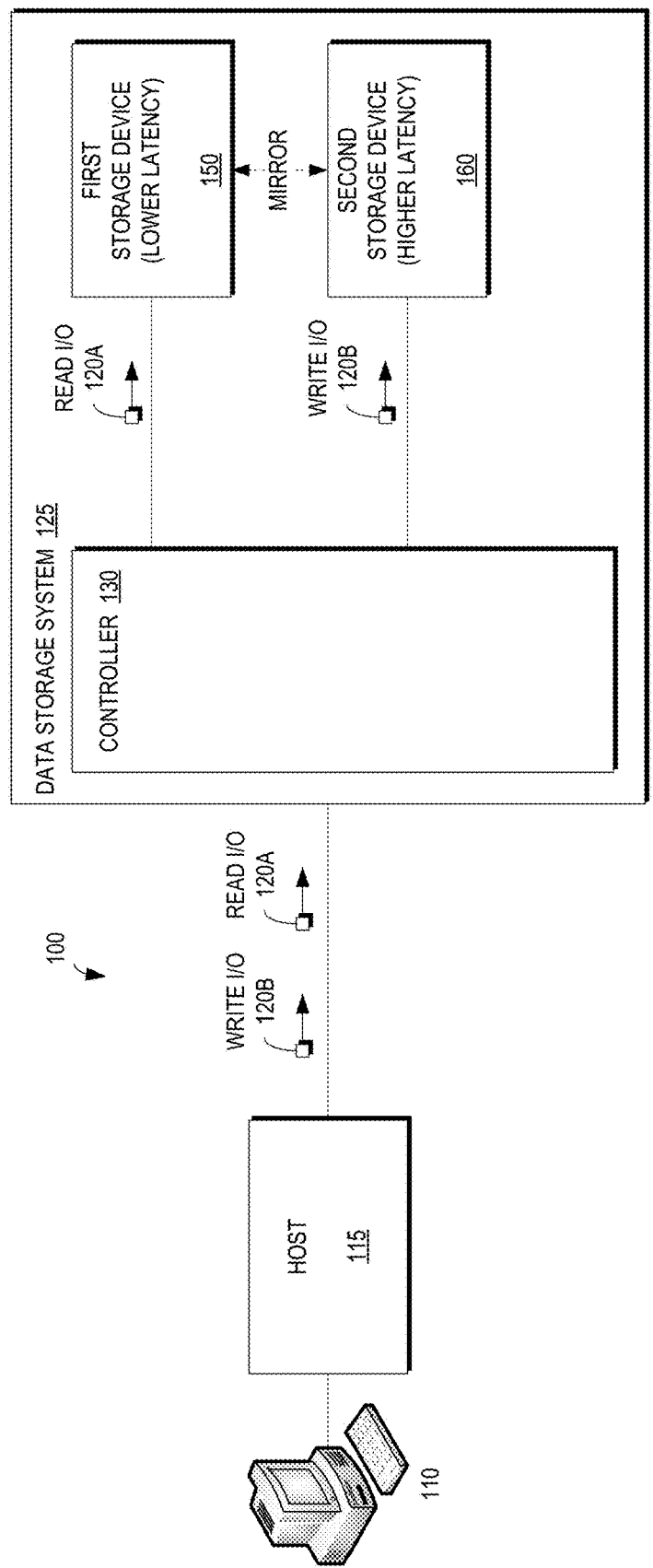
FIG. 1A is a block diagram illustrating a system for mirroring data in a data storage system across a first storage device having a first latency and a second storage device having a second latency according to an example embodiment of the present invention.
Figure 4:
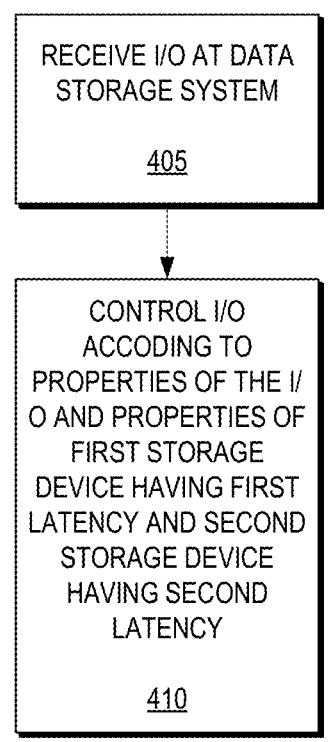
FIG. 4 is a flow diagram illustrating a method according to an example embodiment of the present invention.

FIG. 1A is a block diagram illustrating a system 100 for mirroring data in a data storage system 125 across a first storage device having a first latency 150 and a second storage device having a second latency 160 according to an example embodiment of the present invention. FIG. 4 is a flow diagram illustrating a method according to an example embodiment of the present invention. FIGS. 1A and 4 may be described in conjunction.

As illustrated in FIG. 1A, the data storage system 125 creates a mirror where one leg of the mirror is on, for example, storage having a lower latency (e.g., Flash storage) 150 and one leg is on, for example, storage having a higher latency (e.g., SATA 160). In certain embodiments, the SATA devices 160 can be in a RAID 5 or RAID 6 configuration, thereby providing additional layers of protection. The data storage system may include a controller 130 configured to receive an I/O 120A, 120B from a host 115 in the system 100 (405) and direct the I/O 120A, 120B to one of the first storage device having the lower latency 150 or the second storage device having the higher latency 160 according to properties of the I/O 120A, 120B and the first storage device having the lower latency 150 and the second storage device having the higher latency 160 (410).

Figures 1, 1B:
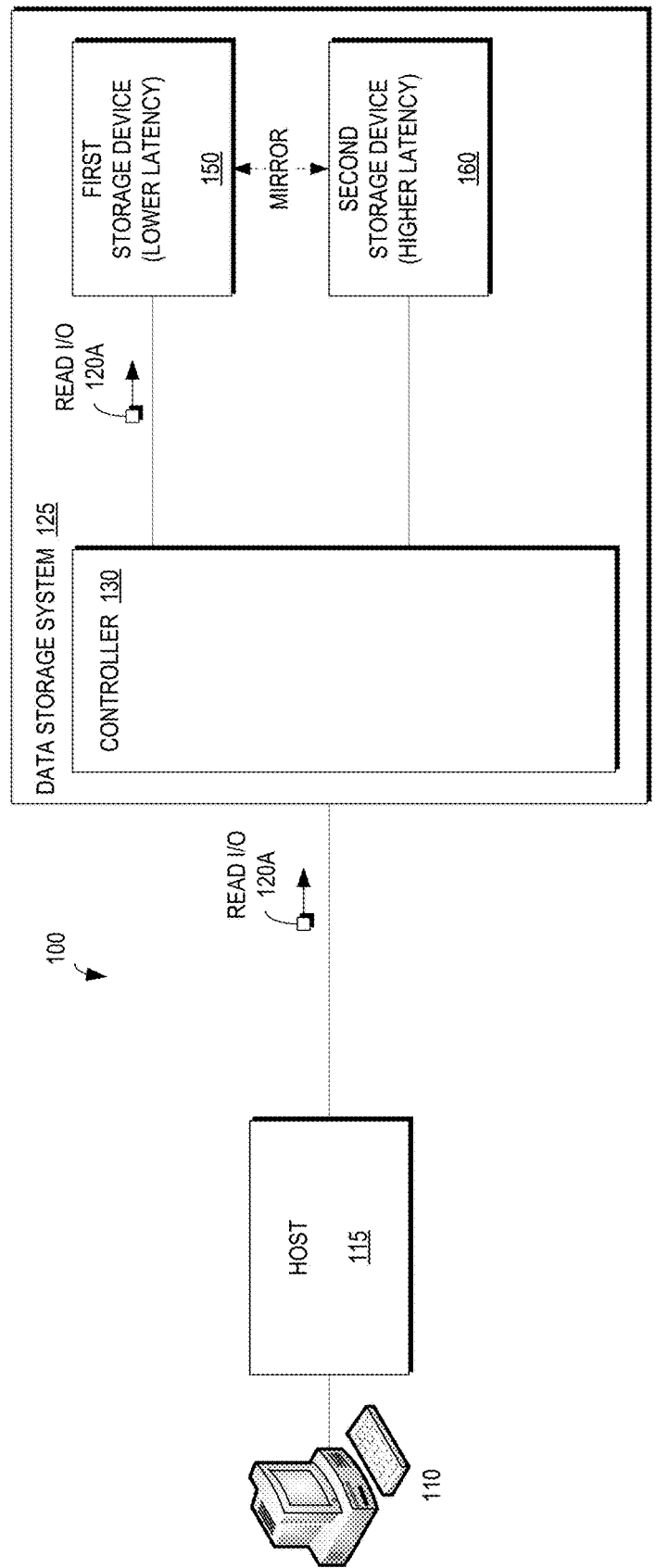
FIGS. 1B-1-1B-2 are block diagrams illustrating a system according to the embodiment of FIG. 1A for handling read I/Os and write I/Os, respectively.
Figures 1, 1B, 2:
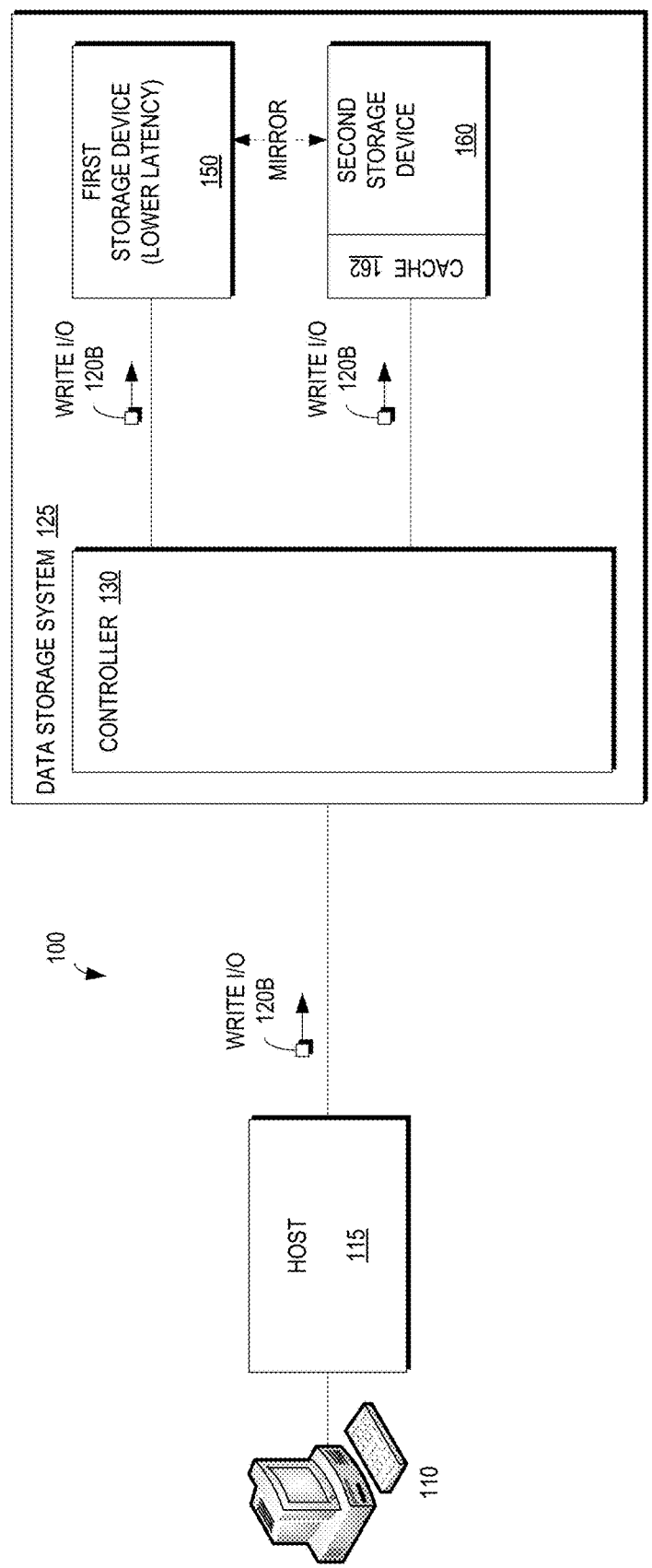
Figure 5:
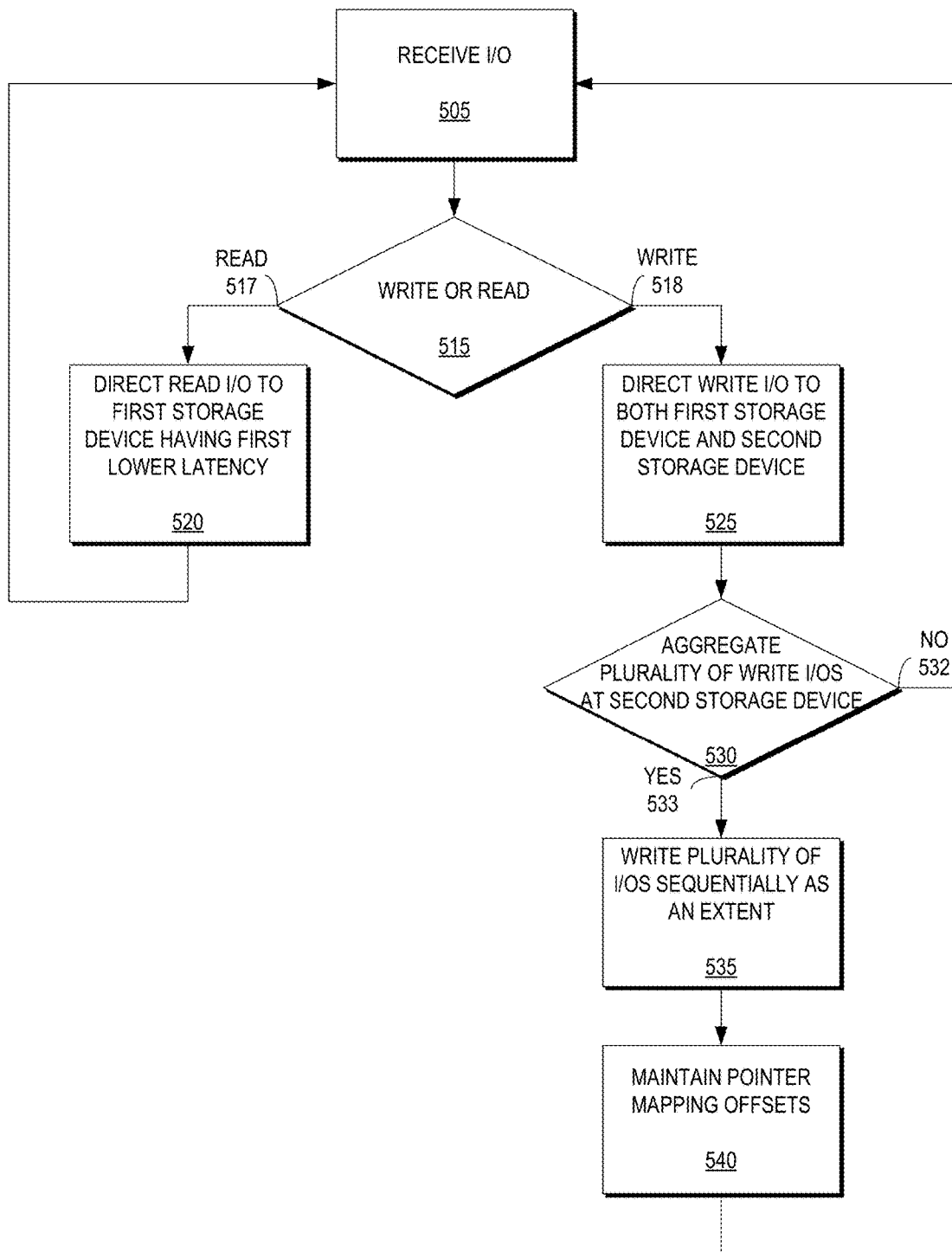
FIG. 5 is a flow diagram illustrating a method of handling read I/Os and write I/Os according to an example embodiment of the present invention.

FIGS. 1B-1-1B-2 are block diagrams illustrating a system 100 according to the embodiment of FIG. 1A for handling read I/Os 120A and write I/Os 120B, respectively. FIG. 5 is a flow diagram illustrating a method of handling read I/Os and write I/Os according to an example embodiment of the present invention. FIGS. 1B-1, 1B-2, and 5 may be described in conjunction.

As illustrated in FIG. 1B-1, the controller 130 may receive an I/O 120A, 120B from the host 115 (505) and determine whether the I/O 120A, 120B is a read I/O 120A or a write I/O 120B (515). If the I/O is a read I/O 120A (517), the controller 130 may direct the read I/O 120A to the first storage device having the first lower latency 150 (e.g., Flash storage) (520). Therefore, in example embodiments of the present invention, reads will be served from the Flash device, and thus read performance of the data storage system 125 will be Flash performance.

However, example embodiments of the present invention also support high throughput for random writes. Therefore, as illustrated in FIG. 1B-2, the controller 130 may determine that the I/O is a write I/O 120B (518) and direct the write I/O 120B to both the first storage device having the first lower latency 250 and the second storage device having the second higher latency 160 (e.g., SATA storage) (525).

Figure 2A:
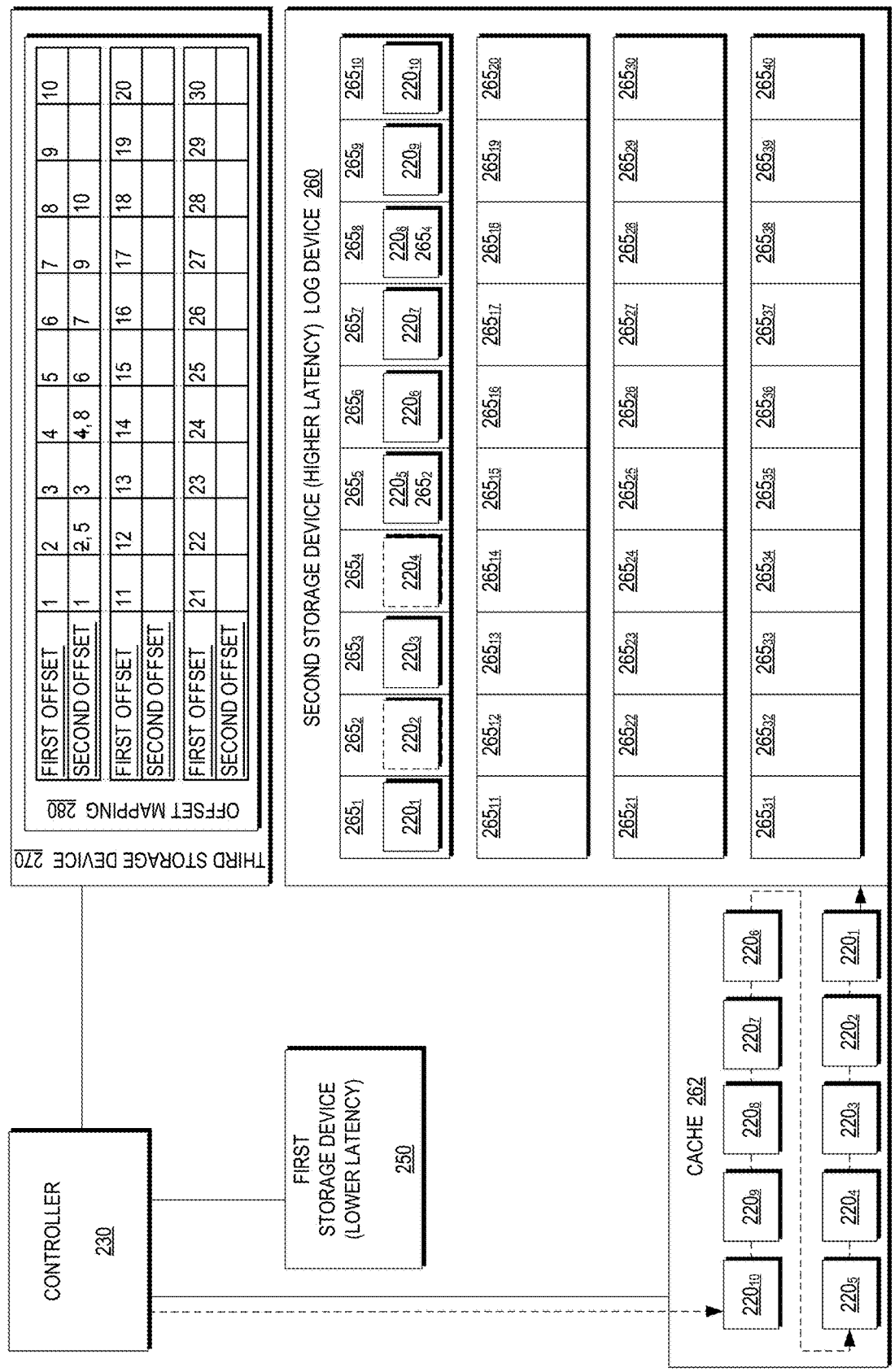
FIG. 2A-2C are a block diagram illustrating a mapping of offsets between a first storage device having a lower latency and a second storage device having a higher latency at respective times.
Figure 2B:
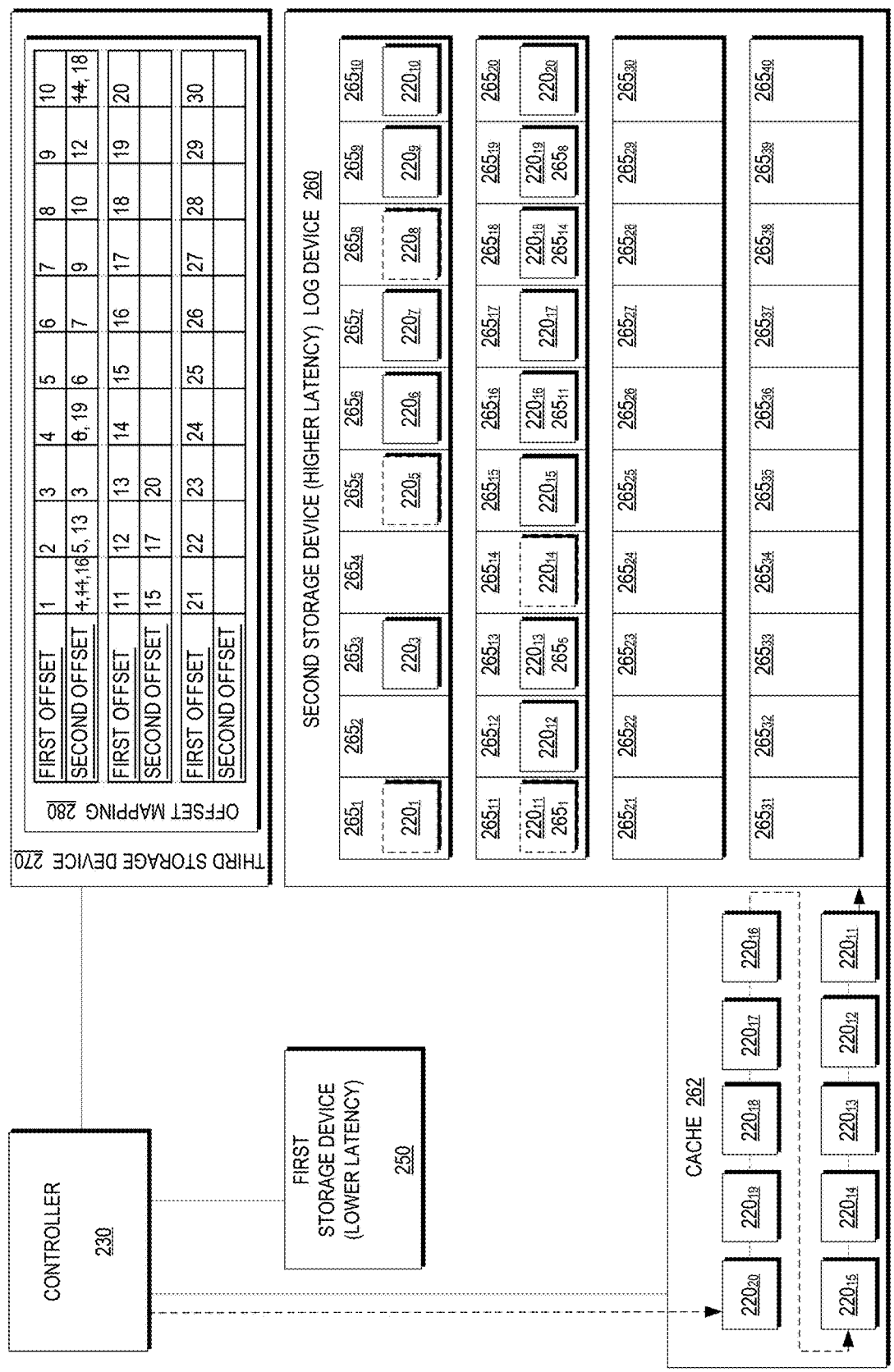
Figure 2C:
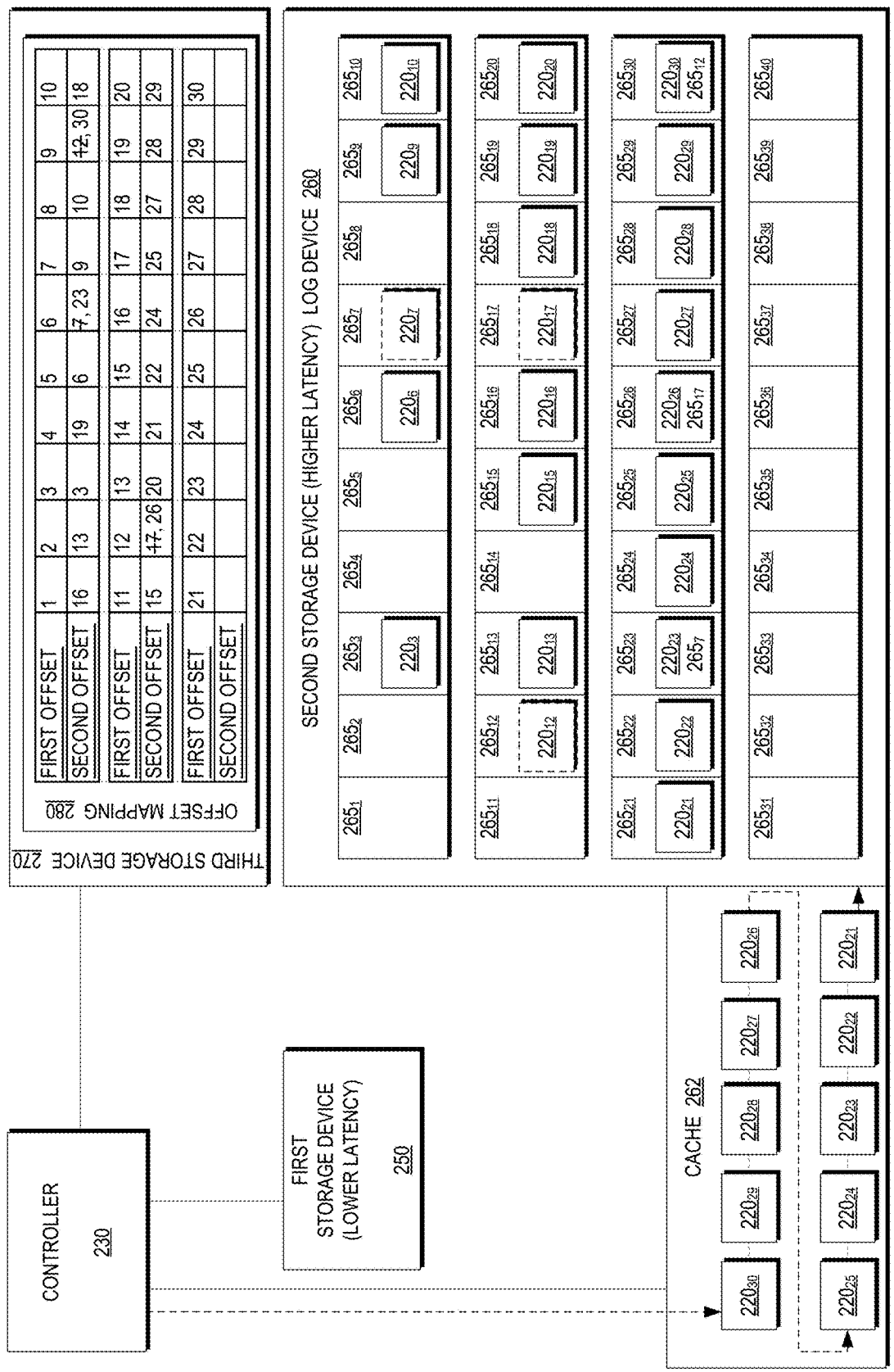
Figures 1, 2D:
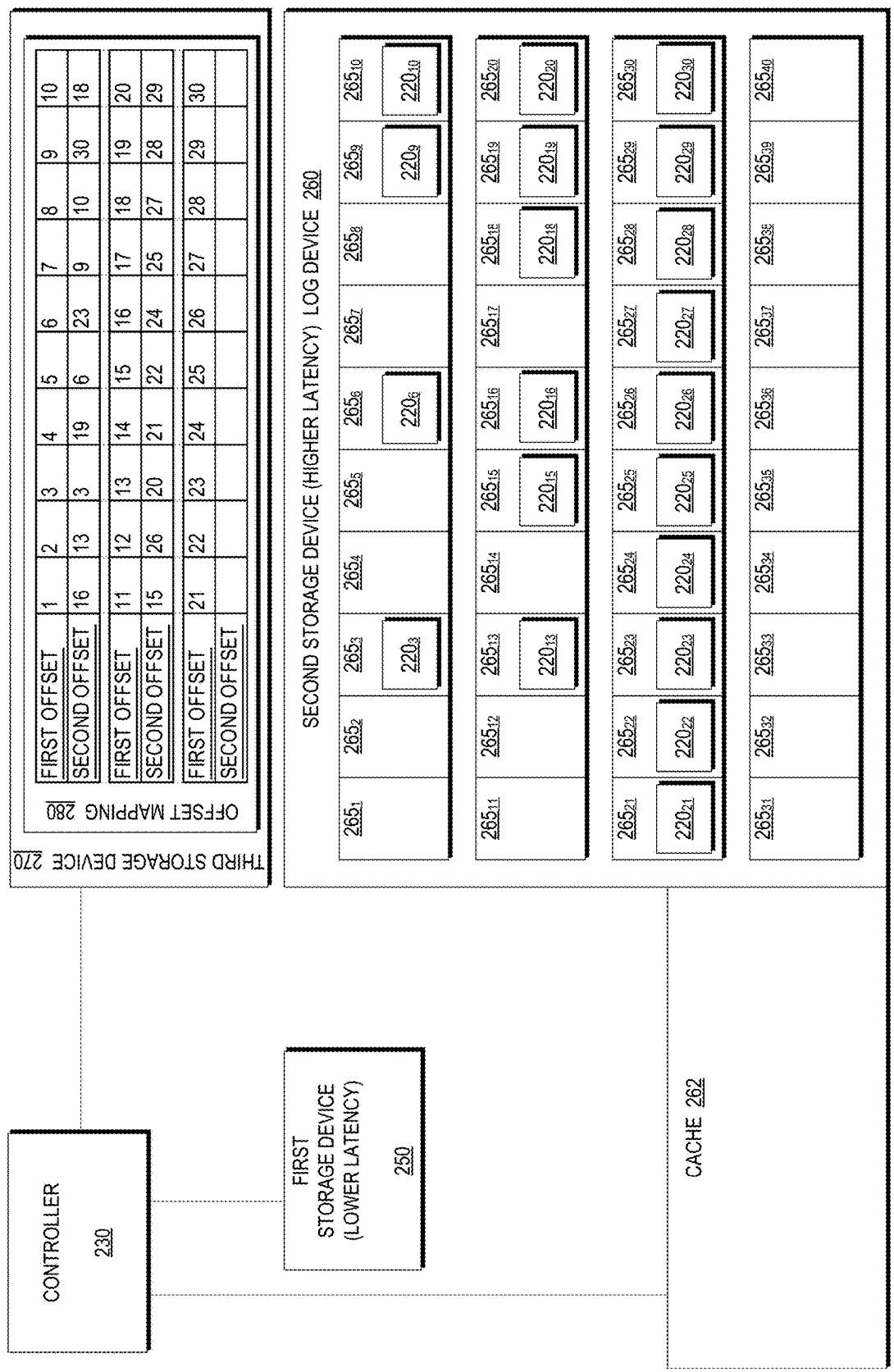
Figures 2, 2D:
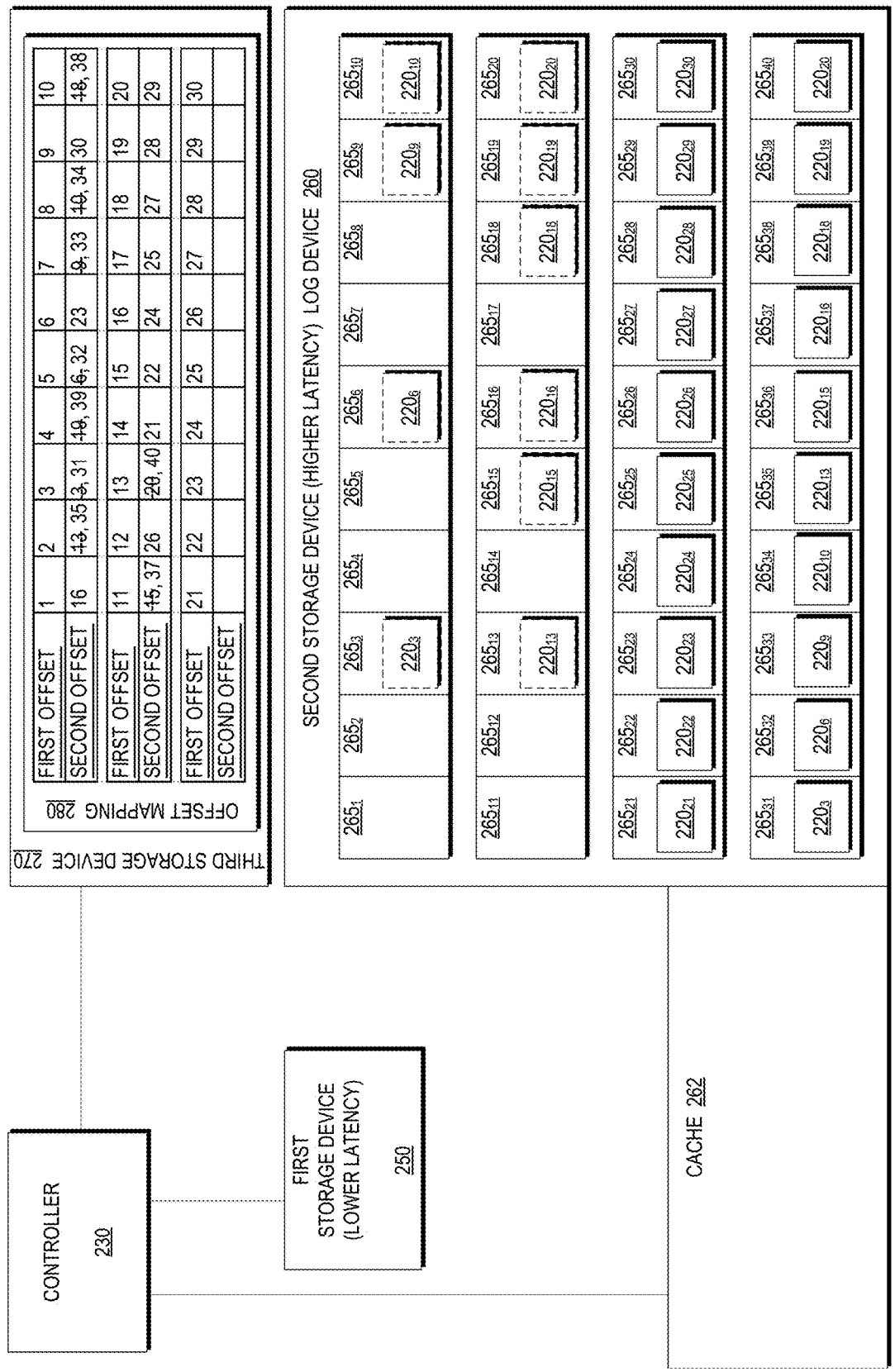
Figures 2, 2D, 3:
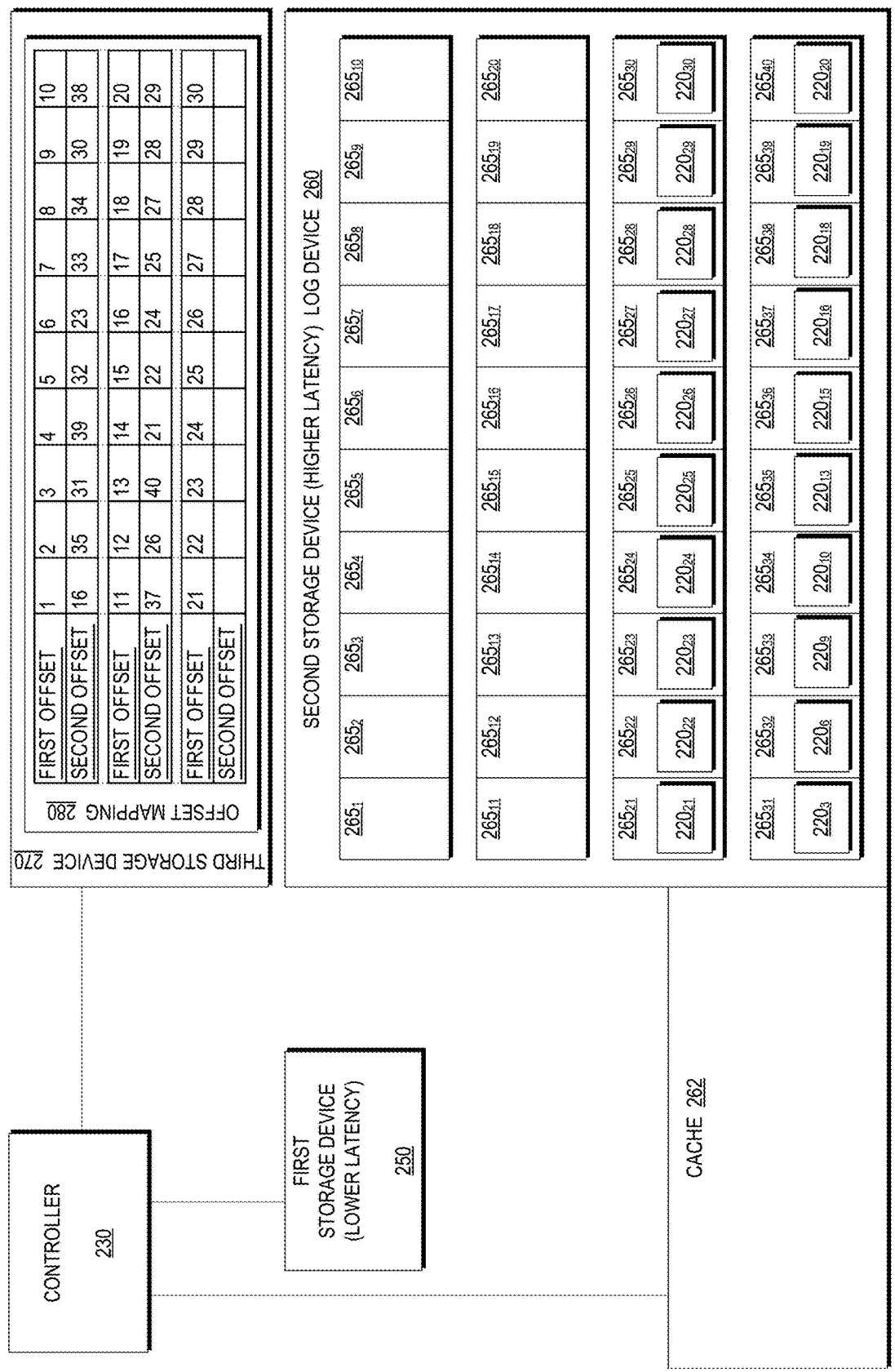
Figure 3:
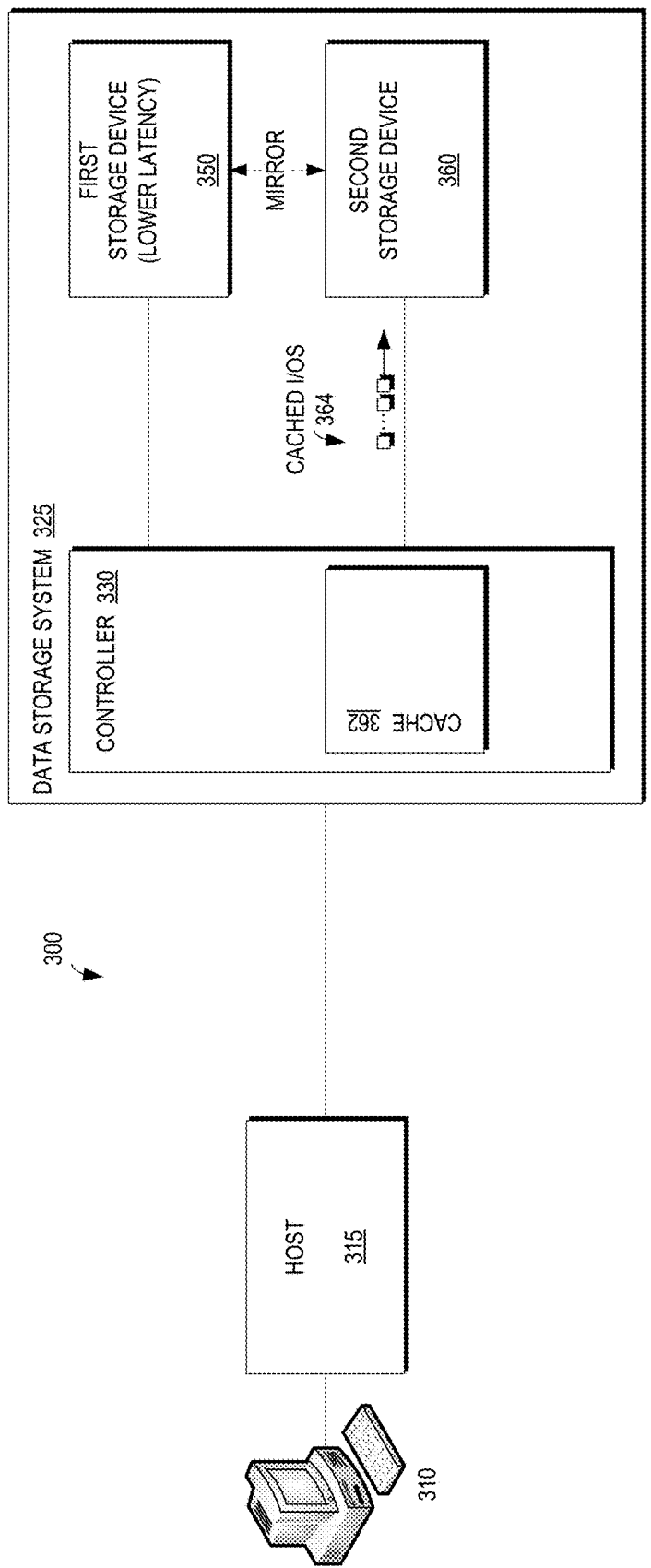

FIG. 3 is a block diagram illustrating a system 300 for storing cached I/Os 364 in a cache 362 for writing to the second storage device 360. In certain embodiments, the controller 130 may include cache 162 for the SATA storage 360 to temporarily store the write I/O 120B (i.e., aggregate a plurality of write I/Os 120B (530)) as described below with respect to FIGS. 2A-2C. If the data storage system 125 has not yet aggregated a plurality of write I/Os 120B (532), the data storage system may continue to receive I/Os 120A, 120B (505).

As will be described in greater detail below with respect to FIGS. 2A-2C, if the data storage system 125 has aggregated a plurality of write I/Os 120B (533), the write I/Os 120B may be written sequentially as an extent (535). The data storage system 125 may allocate on the second storage device having the second higher latency 160 twice or more space than what we allocated on the first storage device having the lower latency 150. The second storage device having the higher latency 160 then may be used by the data storage system 125 as a log device. Therefore, all I/Os will be written to the second storage device having the higher latency 160 (e.g., SATA) device sequentially, a full extent at a time, where an extent may be, for example, 10 MB (or a multiple of the RAID stripe size so as to minimize reads necessary in mirroring to Flash). The data storage system 125 also may maintain pointers held so that the system will know where data is actually last written (540).

As illustrated in FIGS. 2D-1-2D-3 and 6, a cleaning background process will free space on the second storage device having the higher latency 160 (e.g., SATA) in which the data storage system 125 will non-full extents and write a full extent in their place, thereby freeing storage in the second storage device 160. While the meta data (i.e., location of the data in the log) may be embedded in log device, in a preferred embodiment, metadata is at a third storage device (e.g., Flash device separate from the first storage device having the first latency 150) that may be mirrored for additional protection.

FIGS. 2A-2C are a block diagram illustrating a mapping of offsets between a first storage device having a lower latency 250 and a second storage device having a higher latency 260 at respective times. As illustrated in FIGS. 2A-2C, the first storage device having the lower latency 250 may be of a certain size, such as 1 TB and the second storage device having the second higher latency 260 may be a larger size (e.g., twice the size of the first storage device having the lower latency). As illustrated in FIG. 2A, the controller 230 may receive a plurality of write I/Os $220_1$-$220_{10}$ (220 generally) and direct them to both the first storage device having the lower latency 250 according to the address to which they are directed and to the second storage device having the higher latency 260 as a log device. The I/Os 220 may be stored in cache 262 to aggregate a plurality of writes so they may be written sequentially. However, in example embodiments of the present invention, a mapping is needed to determine the allocation of the data in the SATA devices. For example, if the Flash storage crashes and a user wants to read data from a particular offset in the Flash, example embodiments of the present invention may determine the offset in the SATA storage. For example, if repeated chunks are written to the same offset in Flash, the chunks are written to the log device sequentially each time to different locations. Therefore, a mapping of the offset in the Flash storage to the offset in the SATA storage, which may be continuously changing, is beneficial.

The second storage device having the higher latency 260 then may process the write I/Os 220. As illustrated in FIG. 2A, the I/Os 220 may be written to the log device 260 sequentially to respective offsets $265_{0,1}$-$265_{0,10}$, wherein the subscript number represents the offset and is reflected in the offset mapping 280 stored in the third storage device 270 as the second offset. The offset mapping 280 describes a mapping between a first offset for the first storage device having the lower latency (e.g., Flash) 250 and a second offset for the second storage device having the higher latency (e.g., SATA) 260.

For example, I/O $220_1$ may be written to the first storage device having the lower latency 250 at offset 1 (i.e., first offset 1 in the offset mapping 280) and written to the second storage device having the higher latency 260 at offset $265_1$ (i.e., second offset 1 in the offset mapping 280). Similarly, I/O $220_2$ may be written to first offset 2 and second offset 2. I/Os $220_3$ and $220_4$ may be similarly written.

It should be understood that a subsequent I/O may update the data of a previous I/O. For example, I/O $220_2$ (i.e., a previous I/O) may be written to the first storage device having the lower latency 250 at offset 2 (i.e., first offset 2 in the offset mapping 280) and written to the second storage device having the higher latency 260 as a log device at offset $265_2$ (i.e., second offset 2 in the offset mapping 280). Later, I/O $220_5$ (i.e., a subsequent I/O) may be written to update the data of I/O $220_2$ (i.e., the previous I/O) (as reflected by $265_2$ in the I/O $220_5$ written to offset $265_5$ in the second storage device having the higher latency 260). Thus, the controller 230 may direct the subsequent write I/O $265_5$ to the offset to which it is directed in the first storage device having the lower latency 250 (i.e., first offset 2) and also may write the subsequent I/O $265_5$ to the log device 260 at the next available offset (i.e., second offset 5). Accordingly, the controller 230 then may update the offset mapping 280 to indicate that first offset 2 no longer corresponds to second offset 2 (as indicated by the strikethrough) but now corresponds to second offset 5. Similarly, I/O $220_s$ may be written to first offset 4 and second offset 8, with the controller 230 updating the offset mapping 280 to reflect that first offset 4 no longer corresponds to second offset 4 but now corresponds to second offset 8.

As illustrated in FIG. 2B, offsets $265_2$ and $265_4$ in the second storage device having the higher latency 260 are now free. The second storage device then may receive more I/Os $220_{11}$-$220_{20}$, similar to the processing of I/Os $220_1$-$220_{10}$ as described above with respect to FIG. 2A. Likewise, as illustrated in FIG. 2C, more offsets in the second storage device having the higher latency 260 may be free and the second storage device having the higher latency 260 may process addition I/Os $220_{21}$-$220_{30}$.

Figure 6:
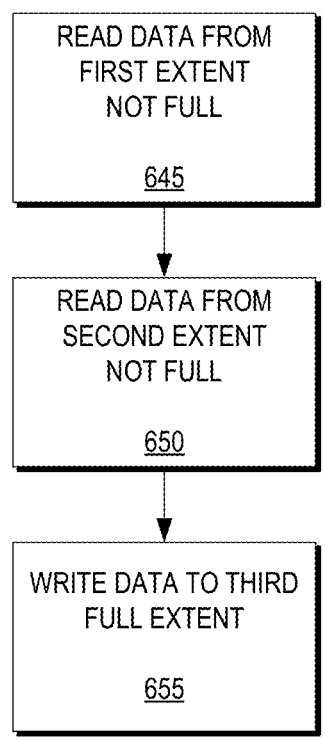
FIG. 6 is a flow diagram illustrating a method for combining partial extents in a second storage device having a higher latency.

FIGS. 2D-1-2D-3 are a block diagram illustrating a cleanup operation for a first storage device having a lower latency 250 and a second storage device having a higher latency 260 at respective times. As described above with respect to FIGS. 2A-2C, while the second storage device having the higher latency 260 may be allocated to be larger (e.g., twice as large) than the first storage device having the lower latency 250, there is some limit to the storage and, as illustrated in FIG. 2D-1, the storage space is now not used efficiently with a plurality of offsets in respective extents being unused resulting from overwrites of previous I/Os by subsequent I/Os. Accordingly, as illustrated in FIGS. 2D-1-2D-3, example embodiments of the present invention may include a cleanup mechanism which frees space in the log device of the second storage device having the higher latency 260. FIG. 6 is a flow diagram illustrating a method for combining partial extents in a second storage device having a higher latency. FIGS. 2D-1-2D-3 and 6 may be described in conjunction.

As illustrated in FIGS. 2D-2 and 6, the controller 230 may read data from a first extent that is not full (e.g., half full) on the second storage device used at the log device having the second higher latency 260 (645) and, similarly, read data from a second extent that is not full (e.g., half full) on the second storage device used as the log device having the second higher latency 260 (650). The controller then may write the data read from the two partially fully extents to a third extent in the second storage device used as the log device having the second higher latency 260 (655). Therefore, the controller may move the data from two or more partially fully extents to one or more full extents (or partially full extents if necessary) to free space in the second storage device having the second higher latency to be used as additional space for the log device.

Example embodiments of the present invention may operate with Flash performance as long as no Flash device fails. It should be understood that data may be stored in the second storage device having the second latency in a RAID cloud. For example, the data stored to the second storage device having the second latency may be separated across a plurality of physical storage devices and may be organized in a RAID cloud in such a way so the data spread across a plurality of volumes. In this manner, the data storage system 225 may handle a workload (i.e., IOPS) without significant impact to response time. A failure of a single device may not affect the performance of the system significantly, the solution for this is to use raid cloud on the SATA devices, (and possibly also on the flash devices). For example, for a raid cloud of 100 SATA devices, I/Os from a failed Flash device may be redirected to the 100 SATA devices yielding similar IOPS. Further, RAID cloud configuration may be used on the Flash side. If the Flash device is also on a RAID cloud then only, for example, one percent of the I/Os of each device will be redirected to SATA devices (thereby significantly reducing any effect on the response time of the data storage system). Further, RAID clouds allow fast recovery of data stored on a failed storage device within the RAID cloud. For example, if have the SATA side is comprised of 100 SATA drives and 100 Flash devices and one Flash device crashes, the data of the failed drive may be recovered quickly from the 100 SATA devices, into the remaining ninety-nine flash devices.

Figure 7:
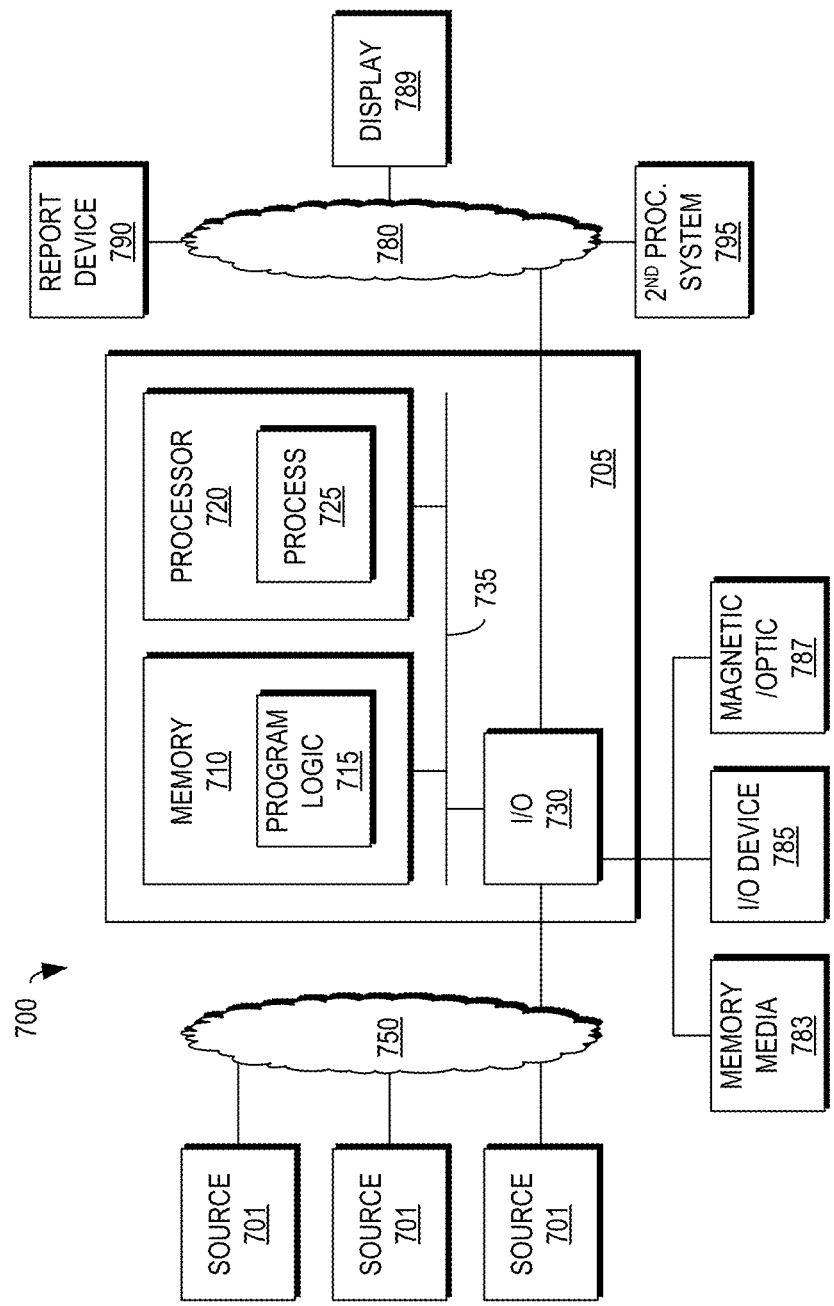
FIG. 7 is a block diagram of an example embodiment apparatus according to the present invention.

FIG. 7 is a block diagram of an example embodiment apparatus 705 according to the present invention. The apparatus 705 may be part of a system 700 and includes memory 710 storing program logic 715, a processor 720 for executing a process 725, and a communications I/O interface 730, connected via a bus 735.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 8:
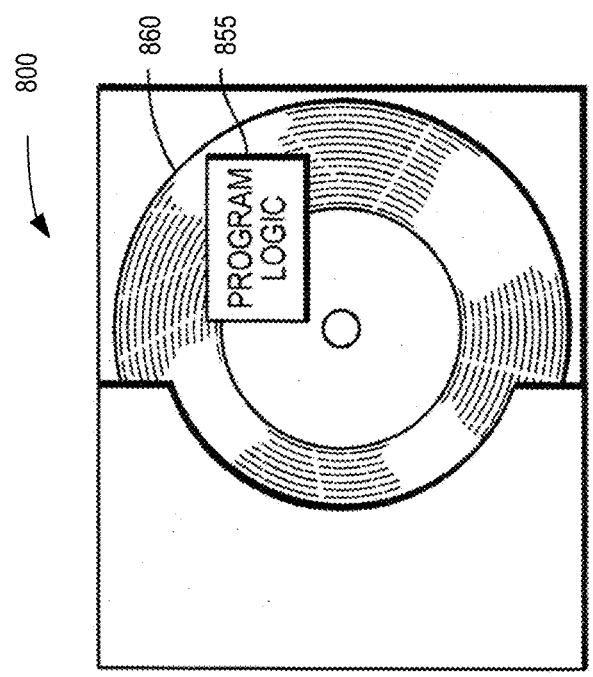
FIG. 8 is an illustration of an example embodiment of the present invention as embodied in program code.

FIG. 8 shows program logic 855 embodied on a computer-readable medium 860 as shown, and wherein the logic 855 is encoded in computer-executable code configured for carrying out the methods of this invention, thereby forming a computer program product 800.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method for mirroring data in a data storage system across a first storage device having a first lower latency, lower than a second higher latency, and a second storage device having the second higher latency, the method comprising:

receiving an I/O at the data storage system; and maintaining an I/O processing performance associated with the first storage device by controlling the I/O to the first storage device having the first lower latency and the second storage device having the second higher latency, wherein the second storage device is used as a log device, and wherein the controlling the I/O is according to properties of the I/O, properties of the first storage device having the first lower latency, and the properties of the second storage device having the second higher latency, wherein the controlling further comprising:

if the I/O is a read I/O, directing the read I/O to the first storage device having the first lower latency;

if the I/O is a write I/O, directing the write I/O to the first storage device having the first lower latency;

directing the write I/O to the second storage device having the second higher latency as a log device sequentially as a first extent, further comprising:

receiving a plurality of write I/Os:

aggregating the write I/O with the plurality of write I/Os; and writing the plurality of write I/Os to the second storage device having the second higher latency as the log device; and storing on a third storage device a mapping between a first offset for the first storage device having the first lower latency, and a second offset for the second storage device having the second higher latency.

2. The method of claim 1 wherein writing the plurality of write I/Os sequentially to the second storage device having the second higher latency as the log device comprises:

writing the plurality of write I/Os sequentially to the second storage device having the second higher latency as the first extent; and maintaining a respective pointer on the third storage device having a third lower latency identifying a storage location on the second storage device having the second higher latency of data written from each of the plurality of write I/Os.

3. The method of claim 2 wherein writing the plurality of write I/Os sequentially to the second storage device having the second higher latency as the log device comprises:

allocating a first lesser amount of storage, less than a second greater amount of storage, on the first storage device having the first lower latency;

allocating the second greater amount of storage on the second storage device having the second higher latency; and freeing storage on the second storage device used as the log device having the second higher latency.

4. The method of claim 3 wherein freeing storage on the second storage device used as the log device having the second higher latency comprises:

reading data from the first extent that is not full on the second storage device used as the log device having the second higher latency, reading data from a second extent that is not full on the second storage device used as the log device having the second higher latency; and writing a third extent that is full to the second storage device used as the log device having the second higher latency comprising the data from the first extent and the data from the second extent.

5. The method of claim 1 wherein the second storage device having a second higher latency is a first Redundant Array of Independent Disks (RAID) cloud storage device comprising a plurality of storage devices having the second latency.

6. The method of claim 5 wherein controlling I/Os to the data storage system according to properties of the I/O and properties of the first storage device and properties of the second storage device comprises:

detecting a failure of the first storage device having the first latency;

directing I/Os intended for the failed first storage device having the first latency to the first RAID cloud storage device having the second latency; and replacing the failed first storage device having the first latency.

7. The method of claim 5 wherein the first storage device having the first latency is a second RAID cloud storage device comprising a plurality of first storage devices having the first latency.

8. The method of claim 7 wherein controlling I/Os to the data storage system according to properties of the I/O and properties of the first storage device and properties of the second storage device comprises:

detecting a failure of a particular first storage device having the first latency of the second RAID cloud storage device;

directing I/Os intended for the failed particular first storage device to the second RAID cloud storage device having the second latency, and replacing the failed particular first storage device having the first latency of the second RAID cloud storage device.

9. A data storage system comprising:

a first storage device having a first lower latency, lower than a second higher latency;

a second storage device having the second higher latency, wherein the second storage device is used as a log device;

a third storage device having a mapping between a first offset for the first storage device having the first lower latency, and a second offset for the second storage device having the second high latency; and a controller configured for:

receiving an I/O at the data storage system; and maintaining an I/O processing performance associated with the first storage device by controlling the I/O to the first storage device having the first lower latency and the second storage device having the second higher latency, wherein the controlling the I/O is according to properties of the I/O, properties of the first storage device having the first lower latency, and the properties of the second storage device having the second higher latency, wherein the controlling further comprising:

if the I/O is a read I/O, directing the read I/O to the first storage device having the first lower latency:

if the I/O is a write I/O, directing the write I/O to the first storage device having the first lower latency;

directing the write I/O to the second storage device having the second higher latency as a log device sequentially as a first extent, further comprising:

receiving a plurality of write I/Os;

aggregating the write I/O with the plurality of write I/Os; and writing the plurality of write I/Os to the second storage device having the second higher latency as the log device; and storing on a third storage device a mapping between a first offset for the first storage device having the first lower latency, and a second offset for the second storage device having the second higher latency.

10. The system of claim 9 wherein the controller is further configured to write the plurality of write I/Os sequentially to the second storage device having the second higher latency as the first extent and maintain a respective pointer on the third storage device having a third lower latency identifying a storage location on the second storage device having the second higher latency of data written from each of the plurality of write I/Os.

11. The system of claim 10 wherein the controller is further configured to allocate a first lesser amount of storage, less than a second greater amount of storage, on the first storage device having the first lower latency, allocate the second greater amount of storage on the second storage device having the second higher latency, and free storage on the second storage device used as the log device having the second higher latency.

12. The system of claim 11 wherein the controller is further configured to read data from the first extent that is not full on the second storage device used as the log device having the second higher latency, read data from a second extent that is not full on the second storage device used as the log device having the second higher latency, and write a third extent that is full to the second storage device used as the log device having the second higher latency comprising the data from the first extent and the data from the second extent.

13. The system of claim 9 wherein the second storage device having a second higher latency is a first Redundant Array of Independent Disks (RAID) cloud storage device comprising a plurality of storage devices having the second latency.

14. The system of claim 13 wherein the controller is further configured to detect a failure of the first storage device having the first latency, direct I/Os intended for the failed first storage device having the first latency to the first RAID cloud storage device having the second latency, and replace the failed first storage device having the first latency.

15. The system of claim 13 wherein the first storage device having the first latency is a second RAID cloud storage device comprising a plurality of first storage devices having the first latency.

16. The system of claim 15 wherein the controller is further configured to detect a failure of a particular first storage device having the first latency of the second RAID cloud storage device, direct I/Os intended for the failed particular first storage device to the second RAID cloud storage device having the second latency, and replace the failed particular first storage device having the first latency of the second RAID cloud storage device.

17. A computer program product including a non-transitory computer readable storage medium having computer program code encoded thereon that, when executed on one or more processors of a computer system, causes the computer system to mirror data in a data storage system across a first storage device having a first lower latency, lower than a second higher latency, and a second storage device having the second higher latency, the computer program product comprising program code of one or more software programs, wherein the program code when executed by at least one processing device causes the at least one processing device to:

receive an I/O at the data storage system; and maintain an I/O processing performance associated with the first storage device by controlling the I/O to the first storage device having the first lower latency and the second storage device having the second higher latency, wherein the second storage device is used as a log device, and wherein the controlling the I/O is according to properties of the I/O, properties of the first storage device having the first lower latency, and the properties of the second storage device having the second higher latency, wherein the controlling further comprising:

if the I/O is a read I/O, direct the read I/O to the first storage device having the first lower latency;

if the I/O is a write I/O, direct the write I/O to the first storage device having the first lower latency;

direct the write I/O to the second storage device having the second higher latency as a log device sequentially as a first extent, further comprising:

receive a plurality of write I/Os;

aggregate the write I/O with the plurality of write I/Os; and write the plurality of write I/Os to the second storage device having the second higher latency as the log device; and store on a third storage device a mapping between a first offset for the first storage device having the first lower latency, and a second offset for the second storage device having the second higher latency.

* * * * *

UNITED STATES PATENT AND TRADEMARK OFFICE
CERTIFICATE OF CORRECTION

Page 1 of 1

PATENT NO.         : 10,452,306 B1
APPLICATION NO.    : 14/144651
DATED              : October 22, 2019
INVENTOR(S)        : Natanzon et al.

It is certified that error appears in the above-identified patent and that said Letters Patent is hereby corrected as shown below:

In the Claims

Column 6
Line 64, Claim 1 change "comprising" to —comprises—

Column 8
Line 38, Claim 9 change "comprising" to —comprises—

Signed and Sealed this
Seventh Day of January, 2020

Andrei Iancu
*Director of the United States Patent and Trademark Office*